United States Patent [19]

Miller

[11] 3,816,073

[45] June 11, 1974

[54] ODOR ELIMINATION SYSTEM

[76] Inventor: Charles H. Miller, 54065 Avenide Carranza, La Quinta, Calif. 92253

[22] Filed: Dec. 1, 1972

[21] Appl. No.: 311,194

[52] U.S. Cl. ................ 21/102 R, 4/10, 4/100, 4/131, 21/54 R, 21/55, 204/149, 204/280
[51] Int. Cl. ................ E03d 9/02, A61l 13/04
[58] Field of Search ....... 21/54 R, 102 R, 55; 4/131, 4/10, 100; 99/220; 210/430; 204/149, 280

[56] References Cited
UNITED STATES PATENTS

| | | | |
|---|---|---|---|
| 981,922 | 1/1911 | Frazier | 04/196 |
| 1,113,323 | 10/1914 | Foye | 204/130 |
| 2,046,467 | 7/1936 | Krause | 204/24 |
| 2,061,323 | 11/1936 | Meinzer | 204/24 |
| 2,428,329 | 9/1947 | Ham | 204/18 D |
| 3,336,220 | 8/1967 | Neidl | 210/14 |
| 3,396,410 | 8/1968 | Gray | 40/40 |
| 3,568,215 | 3/1971 | Riedel | 4/10 |

*Primary Examiner*—Morris O. Wolk
*Assistant Examiner*—Dale Lovercheck
*Attorney, Agent, or Firm*—Nilsson, Robbins & Berliner

[57] ABSTRACT

An odor elimination system for a portable toilet. The toilet comprises a bowl member charged initially with water to a predetermined level and having liquid and solid wastes deposited therein. A pair of electrodes is immersed in the water between the top and bottom of the bowl. The lower electrode can be formed by coating a conductive layer on the bottom of the bowl. Switching means connects the positive terminal of a D.C. voltage source to the lower electrode and the negative terminal to the upper electrode whereby oxygen forms at the bottom electrode and rises to the top of the water, oxidizing odors, bacteria and algae formed in the water.

4 Claims, 4 Drawing Figures

PATENTED JUN 11 1974　　　　　　　　　　　　　3,816,073
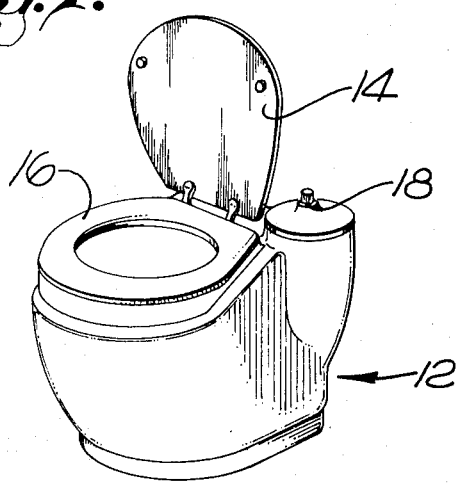
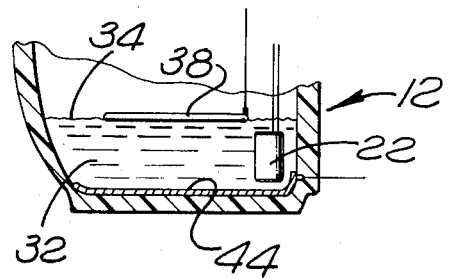
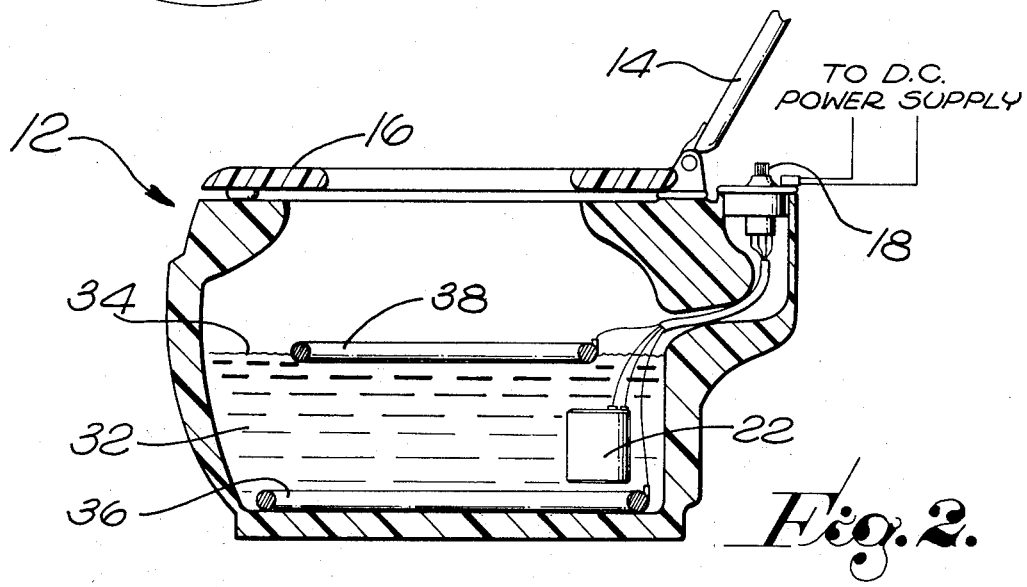
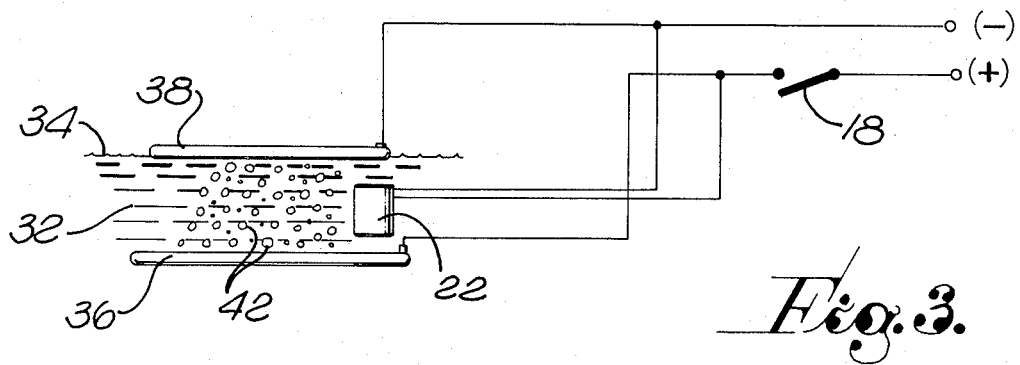

ODOR ELIMINATION SYSTEM

FIELD OF ART

The field of art to which the invention pertains includes the field of sanitary systems, particularly with respect to an odor elimination system for use with a portable toilet.

BACKGROUND AND SUMMARY OF THE INVENTION

Conventional portable mechanical toilets have in recent years become more popular with the increasing advent of use of such devices in commercial aircraft, pleasure boats, trailers, campers, hospitals and vacation homes. The toilets require the storage of liquid and solid wastes for a predetermined period of time until they can be safely disposed of into a conventional sewage facility. Continued use of such toilets until disposal requires a system for eliminating odors and bacterial and algal growth. While certain chemical systems have been utilized which periodically add chemicals to the system to eliminate odors, it has been found that such systems are not effective in eliminating both bacterial and algal growth as well as eliminating odors. Another form of system utilizes a source of high frequency energy to deodorize sanitary waste. However, such a system requires a source of high frequency power which may not be readily available and requires expensive components.

Know prior art includes U.S. Pat. Nos. 1,272,483; 1,293,141; 2,279,578; 3,098,144; 3,169,497; 3,396,410; 2,344,548; 2,700,775; 2,334,791; 2,061,323; 2,046,467; and the following articles: *Scientific Monthly*, May 1945, pages 395–396; Katadyn Inc., reprint from advertisement and description in *Beach and Pool Magazine*, July 1934; and "Something New in Water Sterilization" by H. C. Brandes, *National Business Digest*, Oct. 1934.

In contrast to state of the art support structures, the present invention provides a relatively simple system for eliminating odors and growth from a conventional portable toilet. The conventional toilet may be easily modified to incorporate the system or the system can be built into the toilet. The system utilizes a conventional D.C. source contained in campers, aircraft, and other vehicles, and does not require a separate power supply source. In addition, no chemicals need be added to the system.

Specifically, a pair of electrodes are inserted in the sanitary system and a D.C. potential is applied so that the lower electrode produces oxygen from the system water, the oxygen rising to the top of the water to simultaneously oxidize odors and kill bacteria and algae.

The advantages of this invention, both as to its construction and mode of operation, will be readily appreciated as the same becomes better understood by reference to the following detailed description when considered in connection with accompanying drawings in which like reference numerals designate like parts throughout the figures.

BRIEF DESCRIPTION OF THE DRAWINGS

FIG. 1 is a perspective view of a sanitary system incorporating the odor elimination system of the present invention;

FIG. 2 is a cross-sectional view of the sanitary system of FIG. 1 illustrating the added components for eliminating odors in the sanitary system;

FIG. 3 is a schematic electrical diagram used to illustrate operation of the system; and FIG. 4 is a cross-sectional view of an alternative arrangement of the system.

DESCRIPTION OF THE PREFERRED EMBODIMENTS

Referring now to FIG. 1, there is shown an exemplary embodiment of a sanitary system constructed in accordance with the principles of the invention. The sanitary system includes a conventional portable toilet bowl 12 having an openable lid 14, as well as a seat 16. In one corner of the bowl there is a switch 18 and button therefor.

As illustrated in FIG. 2, when the switch 18 is depressed, a pump and masticator contained as a unit 22 in a single housing is actuated. The pump and masticator unit 22 is normally utilized to break large solid wastes into small particles to form a slurry with reservoir water and pump the slurried reservoir water upwardly to flush the toilet. The pump and masticator unit 22 and flushing mechanism are conventional and form no part of the invention. After a period of use, the slurried water is pumped to a holding tank or to a sewage system by means not shown. A system as described of 8 gallon capacity, with a 4 gallon charge of reservoir water, has sufficient capacity for a family of four for 2 weekends or 5 days.

The toilet bowl 12 normally contains an initial charge of reservoir water 32 which rises partially up in the bowl as the toilet is used. In accordance with the invention, I position within the reservoir water 32 of the bowl a lower electrode 36 and an upper electrode 38. The lower electrode is electrically connected to the positive terminal of a D.C. voltage source and one can conveniently tap into the 12 volt switch 18 current. Alternatively, one can use any 12 volt battery supply such as is contained in most boats, campers or trailers, or which is normally generated by an airplane through its generation system.

The upper electrode 38 is connected to the negative side of the D.C. voltage source. In the embodiment illustrated, electrical connection is made to the masticator switch 18 which actuates the pump and masticator so that when the pump and masticator unit 22 is turned on, the switch 18 simultaneously impresses the D.C. voltage source across the electrodes 36 and 38. In this manner, the electrodes are actuated only when the toilet is flushed. Alternatively, a separate switch, or an overiding switch, can be utilized when it is desirable to operate the odor elimination system independently of mastication.

Referring now to FIG. 3, there is shown a schematic illustration of the operation of the sanitary system of FIGS. 1 and 2. When the switch 18 is closed, the D.C. power supply connects across the electrodes 36 and 38 and an electric current is passed through the water 32. By means of electrolysis of the water, oxygen gas 42 is produced at the lower electrode 36 connected to the positive side of the D.C. voltage source. Hydrogen gas is produced at the upper electrode 38, but the short duration of electrolysis (e.g., only during flushing) is such that there is no dangerous build-up. The waste material which is deposited in the bowl has sufficient electrolytic properties to conduct current through the water 32 between the lower electrode 36 and the upper electrode 38.

The oxygen gas formed at the lower electrode 36 rises through the water 32 and as it rises, acts to oxidize odors and kill bacteria and algae which may be present in the water. Thus, as can be seen, it is preferrable to connect the positive terminal of the battery to the lower electrode 36 and the negative terminal of the battery to the upper electrode 38. However, it should be understood that other positions of the electrodes are possible. For example, both of the electrodes could be positioned vertically in the water, although it has been found that it is preferable to have the lower electrode 36 which is connected to the positive terminal of the battery at the bottom of the liquid, so that the oxygen produced at the lower electrode 36 can rise up in the water.

The electrodes 36 and 38 can be formed of any current conducting material which will not erode in the excreta-containing water. In the embodiment illustrated in FIGS. 2 and 3, the electrodes 36 and 38 are formed of sealed flexible vinyl tubing which is coated with graphite cemented on the surface thereof with a flexible epoxy. The upper electrode 38 is hollow so as to float on the top surface 34 of the reservoir water 32. The lower electrode 36 can be filled or otherwise weighted so that it sinks to the bottom of the bowl.

FIGS. 2 and 3 illustrate an odor elimination system which can be added to a conventional portable toilet. If it is desired to install the system during the manufacture of the toilet, a lower electrode 44, for connection to the positive terminal, can be coated with graphite and epoxy as shown in FIG. 4. Alternatively, gold or silver can be deposited on the lower surface of the bowl (e.g., by well known vacuum deposit techniques or by plating) and utilized as the lower electrode. The upper electrode can be coated on the bowl near but below the top of the initial water level, but it is preferred to float the upper electrode, as described with respect to FIGS. 2 and 3.

In normal operation, it has been found that each time the pump and masticator unit 22 is turned on, whereby the D.C. voltage source is simultaneously connected across the electrodes 36 and 38, three amperes of current at 12 volts produces sufficient oxygen at electrode 36 to destroy all forms of odor, bacteria and algae. Additionally, satisfactory tests have been performed with the current varying from 15 amperes down to 0.25 amperes. While the system normally is run from a 12 volt D.C. source, the system has been tested with a 6 volt battery which has been run down to 2 volts and still operated sufficiently to produce sufficient oxygen to eliminate odors and destroy bacteria and algae.

I claim:

1. An odor elimination system for a portable toilet comprising:
   a bowl member for containing liquid and solid excreta and a reservoir of water;
   a first electrode floating adjacent the top level of said water;
   a second electrode immersed in said water adjacent the bottom level of said water and spaced from said first electrode;
   a source of D.C. voltage having a negative terminal and a positive terminal; and
   means for connecting said D.C. voltage source negative terminal to said first electrode and said positive terminal to said second electrode for generation of oxygen by electrolysis of said reservoir water at said second electrode.

2. An odor elimination system in accordance with claim 1 wherein said toilet contains a masticator in said bowl and means for connecting said masticator to said source of D.C. voltage to operate simultaneously with activation of said electrodes.

3. An odor elimination system in accordance with claim 1 wherein said bottom electrode comprises a conductive coating formed in the bottom of said bowl.

4. An odor elimination system in accordance with claim 3 wherein said conductive coating comprises a layer of gold.

* * * * *